Sept. 28, 1954 A. G. COOLEY 2,690,473

FACSIMILE RECORDING SYSTEM AND APPARATUS

Filed July 16, 1949 3 Sheets-Sheet 1

INVENTOR.
A. G. COOLEY
BY E. R. Evans
Attorney

Sept. 28, 1954 A. G. COOLEY 2,690,473

FACSIMILE RECORDING SYSTEM AND APPARATUS

Filed July 16, 1949 3 Sheets-Sheet 2

INVENTOR.
A. G. COOLEY
BY E. R. Evans
Attorney

INVENTOR.
A. G. COOLEY
BY E. R. Evans
Attorney

Patented Sept. 28, 1954

2,690,473

UNITED STATES PATENT OFFICE 2,690,473

FACSIMILE RECORDING SYSTEM AND APPARATUS

Austin G. Cooley, New York, N. Y., assignor to Times Facsimile Corporation, New York, N. Y., a corporation of New York Application July 16, 1949, Serial No. 105,238

2 Claims. (Cl. 178—6.6)

This invention relates to facsimile recording apparatus, more particularly of a type employing an intermittent or oscillating stylus.

Facsimile recorders, for example of the current-conducting stylus type, have been proposed in which the recording element is carried on an oscillating or slidable supporting member which moves the recording element across the recording sheet or web and then returns to its initial position to commence the recording of the successive line. A disadvantage of this type of recorder is that during the time when the stylus or recording element is being returned to its initial position, the recording must be interrupted and transmission time is wasted on the line or channel. Furthermore such oscillating mechanisms are limited to a relatively low operating rate. In order to obviate these objections, another kind of web or flat-type recorder has been proposed in which three or more spaced styli are arranged consecutively on a stylus carrier or belt, each successive stylus being effective in sequence so as to record a continuous train of signal impulses. An example of this type of recorder is Patent No. 728,254 or my prior Patent No. 2,260,511. In order to effect satisfactory recording, the styli must be accurately indexed and must maintain their proper positioning with the greatest precision during the recording process.

For high speed recording this has been found to be a serious problem, both in respect to the construction of the mechanical drive system, and also the wear and bending of each stylus and vibration or displacement of the stylus holders. Accordingly, it is evident that a recorder which employs only one stylus would have pronounced advantages since it would avoid the mechanical problems that have hampered the development of a satisfactory continuous recorder. However, to be practical, such a recorder must operate in response to a continuous train of signal impulses as pointed out above.

The object of the invention is to provide a facsimile recorder system that will operate with only one stylus to effect a record of a continuous train of signals, i. e. without interrupting the signals while the recording element is being restored from the final to the initial recording position with consequent waste of line time. Obviously the invention may be applied to recorders which do not employ a current-conducting stylus if the relation of the recording element and the recording medium is similar, as for example, a recorder employing a relatively movable recorder lamp and light-sensitive recording paper.

Another object of the invention is to provide improved signal storage apparatus for a facsimile recorder.

A further object of the invention is to provide an improved signal storage apparatus arranged to receive a continuous train of signals and repeat the stored signals cyclically at a higher rate than they are received, with intermediate periods during which no signals are repeated.

In accordance with the invention, the recording element of a facsimile recorder, which is operative during only a fraction of the time, is energized by signal storage apparatus during operative periods. The signal storage equipment is arranged to store the received signals continuously and then repeat a group of stored signals to the recording element at a high rate of speed, thereby permitting a hiatus in the recording process during which a recording element can be properly positioned to commence a subsequent recording cycle.

In the case of a recorder provided with an endless stylus carrier or belt, the belt can be driven at three times normal speed. Assuming that signals are received from a transmitter which scans the copy from one edge to the other 60 times a minute, these signal impulses can be recorded on a magnetic storage element in the form of a disk or ring so that each scanned line is recorded on the circumference of the disk or ring. If the recording element requires twice as long to return from the end to the beginning of the scanning line as it does to traverse the recording line on the recorder, as stated above for purposes of explanation, the stored signals may be transferred to the recording element during the recording portion of the cycle at three times the normal scanning rate or in 1/180 of a minute. By synchronizing the operation of the recording stylus and the storage device, it will be apparent that a continuous train of impulses can be recorded in this manner on the recording medium with a single stylus or recording element which is operative only part of the time.

Any high fidelity electric-signal storage mechanism from which the signals can be erased and which is capable of recording signal amplitudes and frequencies in the ordinary voice range can be employed. A magnetizable metallic member or a coating upon a suitable base is employed to form a signal recording device of a type similar in principle to that used for sound recording. In recording, the magnetic flux is applied to or passed through the tape or steel ribbon.

The foregoing and other objects and features of the invention will be best understood from the following description of a preferred embodiment thereof shown in the accompanying drawings, wherein Fig. 1 is a side view, partly in section, of a preferred form of magnetic signal storage mechanism;

Figure 4:
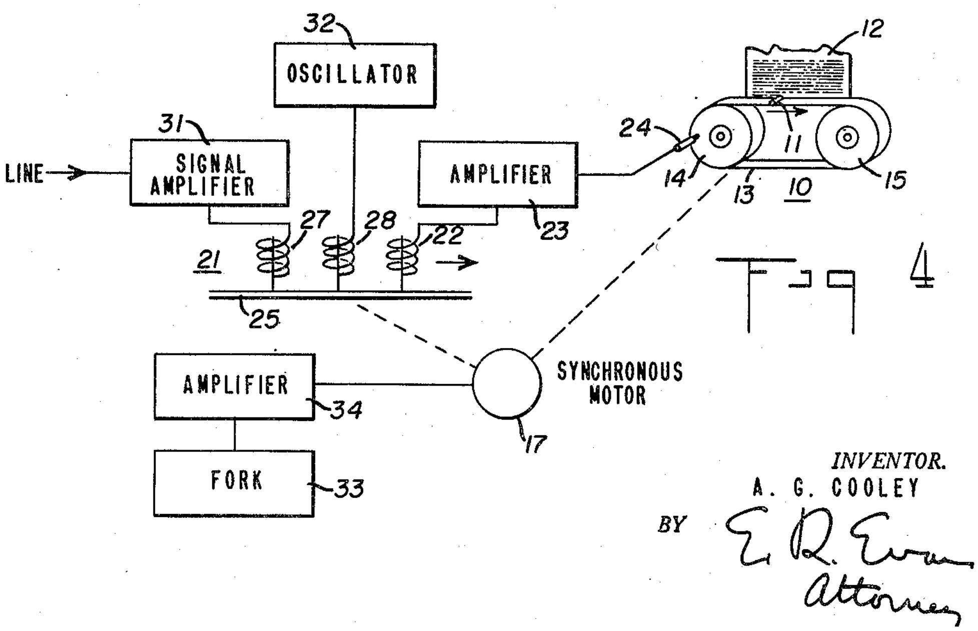
Fig. 4 is a schematic view of the signal storage and recording element in a preferred system shown by way of example.

Referring to Fig. 4, the system as shown comprises a flat-type or continuous recorder 10 having a single recording element or stylus 11 adapted to be propelled across the face of the recording sheet 12 by an endless stylus carrier or belt 13. The belt 13 may be made of beryllium copper or other suitable material and is driven uniformly at synchronous speed in any suitable manner, for example, as shown in my co-pending application, Ser. No. 105,237, filed July 16, 1949. A pair of spaced drive or idler pulleys 14 and 15 are shown supporting the belt 13 and a drive connection for the belt is indicated to a synchronous motor 17. Obviously other types of recorders may be employed, that shown being intended to indicate the general class of such recorders in which a recording element has relative movement with respect to the recording surface or sheet and operates cyclically through recording and non-recording periods. Another example of such a recorder is that in which the stylus or recording element is reciprocated back and forth on a stationary guide or mounted on a pivoted disc or supporting arm, as shown in the above mentioned Patent No. 728,254.

In accordance with the invention, the intermittently operative stylus 11 is connected to a signal storage device 21 by means of a pickup magnet 22, amplifier 23 and contact brush 24 so that signals continuously stored on a magnetic tape or strip 25 may be applied to the stylus 11 during the cyclic recording periods. The storage device 21 as shown includes a recording head 27 and an erasing head 28 in addition to the pickup or reproducing head 22. The received signal impulses from the remote transmitter are amplified in the amplifier 31 and impressed upon the tape or magnetizable recording element 25 through the recording head 27. The stored signals are picked up by the reproducing head 22 after which the signals are erased from the storage tape 25 by the high-frequency current generated by the source 32 and applied to the erasing head 28, thus conditioning the magnetic tape for reception of additional signals applied through the recording head 27. The relative movement between the tape 25 and the heads 22, 27 and 28 is controlled by their connection to the synchronous motor 17 or in any other desired manner in synchronism with the movement of the recording stylus 11 and with the scanning mechanism of the remote transmitter. As shown by way of example, the synchronous motor 17 is operated at constant speed from the fork frequency standard 33, the output of which is amplified in an amplifier 34 in the usual manner. With this arrangement it will be evident that the continuous train of signal impulses from the facsimile transmitter received over the line can be recorded by the single stylus 11 by controlling the position and movement of the recording and reproducing heads 27 and 22 so that the stored signals are repeated to the stylus 11 only during the period when it is in contact with the recording sheet or web 12.

Figure 1:
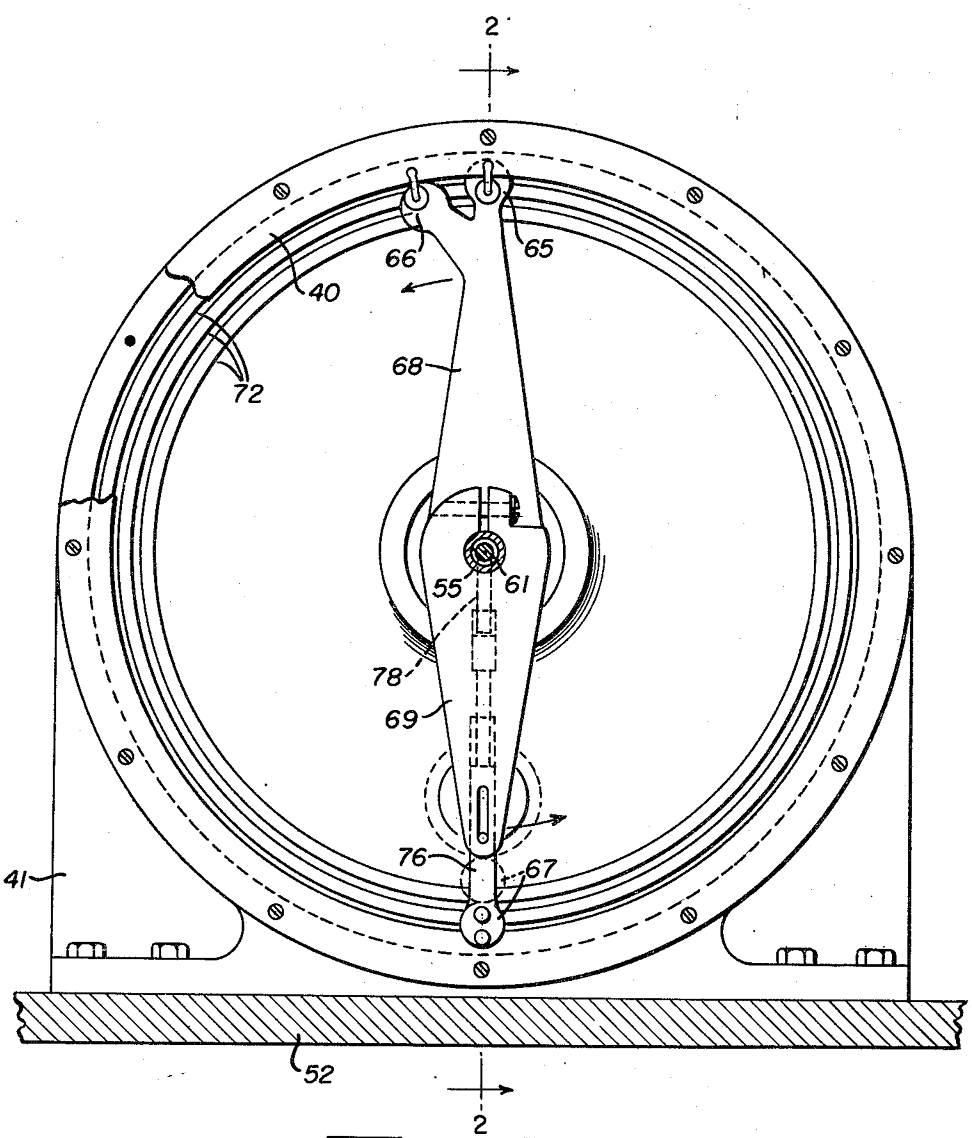
Figure 3:
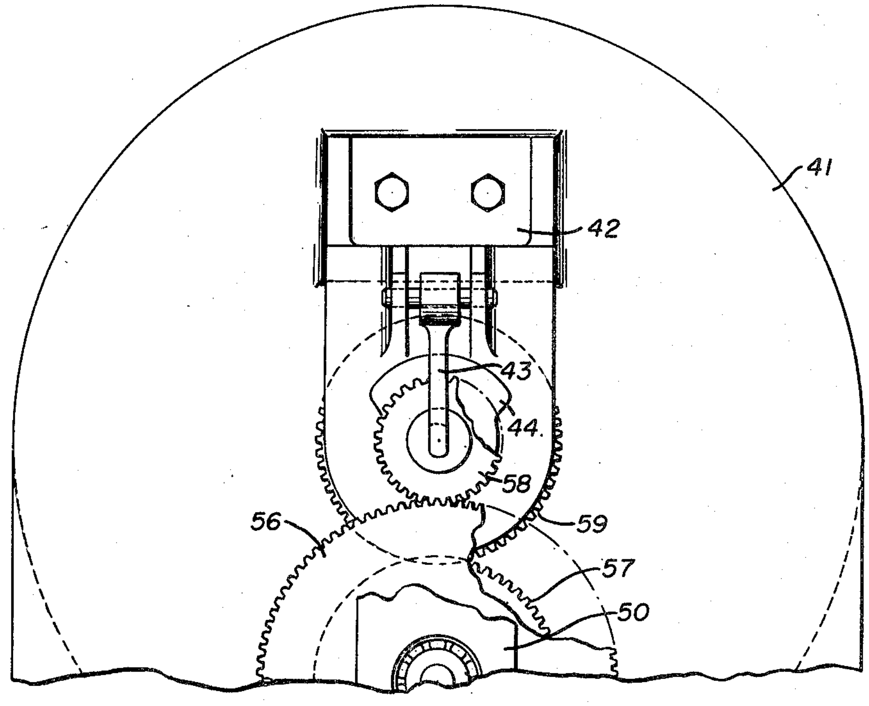
Fig. 3 is an end elevation of the same showing the side opposite to that shown in Fig. 1.
Figure 2:
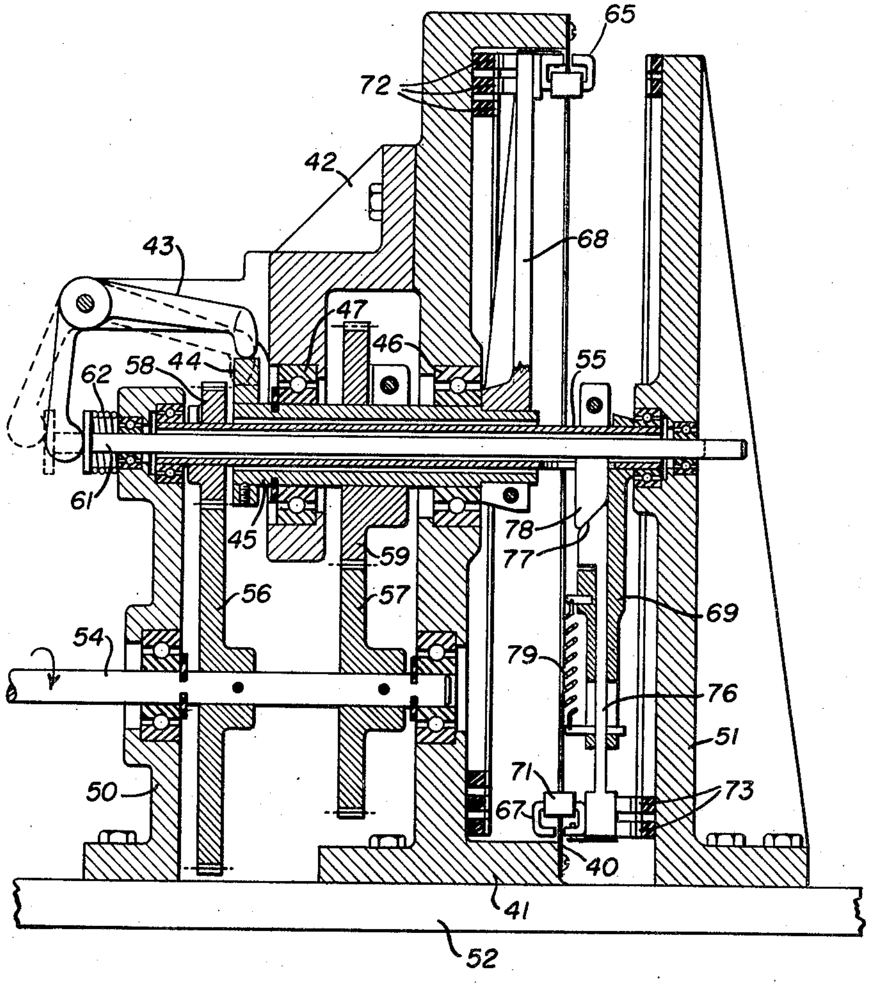
Fig. 2 is a longitudinal sectional view of the storage mechanism shown in Fig. 1.

The construction of a preferred form of signal storage device is shown in Figs. 1, 2 and 3. Referring to these figures, the storage device shown is a magnetic recorder-reproducer in which the recording medium consists of a toroidal coated tape or steel ring 40 which is fixedly secured to the outer face of a cylindrical casing 41. On the opposite face of the casing 41 from the magnetic storage element 40 is mounted an L-shaped frame 42 carrying a pivoted rocker arm 43. The inner end of the rocker arm 43 engages a rotary cam 44 mounted on a stub shaft 45 which rotates in the bearings 46 and 47 carried by the supports 41 and 42. On either side of the cylindrical casing 41 are mounted vertical brackets or bearing supports 50 and 51 which may be bolted to a common base member 52. The vertical support 50 is provided with bearings for the drive shaft 54 and hollow shaft 55. The shaft 54 carries the driving gears 56 and 57 meshing with the pinion 58 and 59, respectively, on the shafts 55 and 45. The ratio of the gearing may be assumed to be such that the stub shaft 45 rotates at one-third the speed of the hollow shaft 55. A reciprocable rod 61 inside the hollow shaft 55 is oscillated by the rocker arm 43 against the compression spring 62 and serves to actuate the reproducing or pick-up head of the magnetic recording device, as will be explained hereinafter.

The magnetic storage arrangement comprises rotatable recording and erasing elements or heads 65 and 66 and an independently rotated pickup or reproducing head 67, as shown in Figs. 1 and 2. The recording and erasing heads are carried on a rotatable arm 68 which is secured to the stub shaft 45 so that it rotates at the slower speed. The erasing head 66 is located in front of the recording head 65 and serves to condition the magnetic recording area for receiving signals which are stored by the magnetization of the tape or ring 40 as well-known in the art. The pickup or reproducing head 67 is carried on a second rotatable arm 69 secured to the outer end of the hollow shaft 55 which rotates at a higher speed, say three times the rotative speed of the shaft 45 carrying the arm 68. Each recording and reproducing head consists of a U-shaped magnet carrying the usual coil 71, the ends of the magnet core embracing the inner edge of the magnetic tape or strip 40 along the same peripheral line. Electrical connections are made to the coil 71 through brushes bearing on the respective collector rings 72 and 73.

In the construction shown the high speed arm 69 carrying the pickup head 67 rotates continuously, the head being retractable to the position shown on the dotted lines in Fig. 1 in order to clear the elements 65 and 66 and to effect reproduction during only one out of every three revolutions; namely, during the period when the recording stylus 11 is traversing the recording area. As shown, the reproducing or pickup head 67 is mounted on a reciprocable bar 76 in the arm 69, the inner end of which is provided with a sloping cam surface 77 cooperating with the cam member 77 attached to the reciprocable rod 61 whereby the axial movement of the rod 61 projects and retracts the arm 76 against the tension of the helical spring 79. Therefore, it will be evident that the time during which the pickup head 67 is moved outward to the position shown in full lines in Figs. 1 and 2, in which it is operative to pick up the stored signals on the ring 40, is controlled by the shape and angular position of the cam 44 which controls the position of the element 67 through the rocker arm 43, push rod 61 and cam 78.

In operation the recording head 65 rotates in synchronism with the scanning mechanism of the remote transmitter and with the stylus 11 of the recorder and is effective to record or store the received signals continuously on the magnetic tape or ring 40. The pickup or reproducing element 67 is rotated three times as fast as the recording head and during every third revolution becomes operative to transfer the stored signals to the recording stylus 11 which during this period is traversing the recording sheet 12. Therefore, a continuous train of signals from the line is stored in the signal storage device and transferred at a higher rate intermittently to the facsimile recorder 10 so that a single intermittently operated stylus can be used in the recorder to record the continuous train of facsimile signals.

It will be understood that various changes and modifications may be made in the construction shown and described above for the purpose of explaining the invention without departing from the scope thereof.

I claim:

1. A facsimile system of the character described comprising a facsimile line-by-line recorder having a single movable recording element which is alternately operative and non-operative during the recording process, signal-storage means associated therewith having a magnetizable signal-storage member, and recording and reproducing elements cooperative with said signal-storage member, means including said signal-storage recording element for storing received signals continuously during a recording cycle for a complete picture or image in said magnetizable signal-storage member, means for producing relative movement between said signal-storage reproducing element and said magnetizable member, to pick up or reproduce signals stored therein, in synchronism with the movement of said facsimile recording element, and means including said signal-storage reproducing element for repeating all of said continuously stored signals intermittently to said facsimile recording element during its intermittent operative periods.

2. A facsimile system of the character described comprising a recorder provided with a movable stylus and means for repeatedly traversing the stylus during recording across the recording area of the recorder and returning the stylus after the recording period successively to the beginning of each excursion constituting a recording cycle, storage means for continuously storing a continuous train of facsimile signals and for intermittently repeating said stored signals to said stylus at such a higher rate during successive recording cycles as to record all of said signals and means for synchronizing the operation of the storing and recording devices.

References Cited in the file of this patent

UNITED STATES PATENTS

| Number | Name | Date |
|---|---|---|
| 1,771,360 | Thurm | July 22, 1930 |
| 1,771,820 | Rtcheouloff | July 29, 1930 |
| 1,883,907 | Hathaway | Oct. 25, 1932 |
| 1,941,618 | Nemirovsky | Jan. 2, 1934 |
| 1,945,626 | Baird | Feb. 6, 1934 |
| 2,129,483 | Van Deventer | Sept. 6, 1938 |
| 2,353,631 | Bliss | July 18, 1944 |
| 2,355,369 | Finch | Aug. 8, 1944 |
| 2,512,015 | Graveel | June 20, 1950 |
| 2,513,112 | Shepherd | June 27, 1950 |
| 2,520,050 | Neufeld | Aug. 22, 1950 |
| 2,561,698 | Hogan | July 24, 1951 |
| 2,596,741 | Tyler | May 13, 1952 |

FOREIGN PATENTS

| Number | Country | Date |
|---|---|---|
| 481,287 | Great Britain | Mar. 8, 1938 |